US009316340B2

(12) United States Patent
Liu et al.

(10) Patent No.: US 9,316,340 B2
(45) Date of Patent: Apr. 19, 2016

(54) ACTIVELY DRIVEN SPIRAL PIPELINE ROBOT

(71) Applicant: SOUTHWEST PETROLEUM UNIVERSITY, Chengdu (CN)

(72) Inventors: Qingyou Liu, Chengdu (CN); Tao Ren, Chengdu (CN); Yonghua Chen, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 14/432,485

(22) PCT Filed: Dec. 8, 2012

(86) PCT No.: PCT/CN2012/086237
§ 371 (c)(1),
(2) Date: Mar. 31, 2015

(87) PCT Pub. No.: WO2014/079116
PCT Pub. Date: May 30, 2014

(65) Prior Publication Data
US 2015/0300554 A1    Oct. 22, 2015

(30) Foreign Application Priority Data
Nov. 24, 2012  (CN) .......................... 2012 1 0481893

(51) Int. Cl.
*F16L 55/32*         (2006.01)
(52) U.S. Cl.
CPC ..................... *F16L 55/32* (2013.01)
(58) Field of Classification Search
CPC .................. F16L 55/30; F16L 55/32
See application file for complete search history.

(56) References Cited

U.S. PATENT DOCUMENTS

| 774,525 | A | * | 11/1904 | Mack | F16L 55/30 |
| | | | | | 104/138.2 |
| 2,742,259 | A | * | 4/1956 | Boucher | F16L 55/30 |
| | | | | | 104/138.2 |
| 4,537,136 | A | * | 8/1985 | Douglas | F16L 55/30 |
| | | | | | 104/138.2 |
| 2015/0377405 | A1 | * | 12/2015 | Down | F16L 55/30 |
| | | | | | 73/865.8 |

FOREIGN PATENT DOCUMENTS

| CN | 101117138 A | 2/2008 |
| CN | 101117138 A | 2/2008 |
| CN | 101435521 B | 6/2010 |
| CN | 101559594 B | 9/2010 |
| KR | 100784932 B1 | 12/2007 |
| KR | 20090010697 A | 1/2009 |

* cited by examiner

Primary Examiner — Kevin Hurley
(74) Attorney, Agent, or Firm — Gokalp Bayramoglu

(57) ABSTRACT

An actively driven spiral pipeline robot is disclosed, comprising: a body, a power device, a driving shaft, an axle, a driving wheel carrier mounted at one end of the body, and a variable diameter mechanism disposed on the driving wheel carrier. The axle is disposed on the variable diameter mechanism. A driving wheel is fixedly mounted on the axle. The driving shaft and the axle are connected via a connector. The driving shaft is further connected with an output shaft of the power device via a transmission device. The present invention has following beneficial effects: a scope of application of the robot is expanded, an operation is stable, and an axial force is large. In addition, an axial position of the robot is adjusted by controlling an operation of the driving wheel, and an adjustment precision is high.

13 Claims, 9 Drawing Sheets

ACTIVELY DRIVEN SPIRAL PIPELINE ROBOT

TECHNICAL FIELD

The present invention relates to a robot walking in a pipeline, and in particular, to an actively driven spiral pipeline robot.

BACKGROUND ART

At present, the pipeline robot is a new technology rising in recent years and combining fields of precision machinery, robotics, new material and control theory. A great many micro pipelines, such as heat transfer pipes for steam generators in nuclear power plant and industrial pipes and gas pipes in fields of metallurgy, oil, chemical, city heating supply and refrigeration, are used in modern industrial and agricultural productions and daily life. The poor work environment of these pipeline systems usually causes corrosion or fatigue failure to the pipes or makes potential internal pipeline faults develop into breakages, thus leading to leakage accidents. Therefore, the monitoring, diagnosis, clearing and maintenance of the pipelines has become the key to guarantee the security, smooth and efficient operation of the pipeline systems, and the in-serve and on-line pipeline detection has also become one of important directions of applications and developments of nondestructive inspection technology for pipeline. However, the operator cannot directly arrive at or be involved into the pipeline because of the local environment or the size limitation of the pipeline, thus, it is difficulty to maintain the pipeline.

With the rapid development of the pipeline robot both domestically and abroad, more and more pipeline maintenance work is performed by the pipeline robot. The moving mechanism is an important component of the pipeline robot. A pressure peristaltic inchworm type caterpillar device developed by Tokyo Institute of Technology has a slow speed and a complex control system. Another device is spiral driven type, such as a spiral driven circular pipeline robot disclosed in Chinese Patent No. 2007100500568, in which a driving wheel carrier is mounted on a shaft of a DC motor, three arm ends of the driving wheel carrier are hinged to a middle part of a driving wheel rod extending in a length direction of a body respectively, a driving wheel is mounted at an end part of the driving wheel rod, an included angle between an axis of rotation of the driving wheel and an axis of the body ranges from 3° to 30°, and a guide wheel carrier is mounted at a middle or front part of the body. The conventional spiral moving device generates an axial driving force to drive the robot forward by driving the driving carrier provided with a driving wheel to rotate and then driving the driving wheel mounted at the border of the driving carrier to spirally move along the inner wall of the pipeline by the driving carrier. Such structure has disadvantages of great energy loss and non-reliable transmission movement. The moving speed of the robot is affected by the value of the included angle between the axis of rotation of the driving wheel and the axis of the body. When the included angle is relatively smaller, the spiral angle of the spiral trail of the movement of the driving wheel is relatively smaller, the force driving the driving wheel to rotate is relatively larger, the rotation speed of the driving wheel is relatively quicker, and thus the robot moves smoothly. However, the spiral angle of the spiral trail is relatively smaller and the moving speed is relatively slower. With the increase of the included angle, the force driving the driving wheel to rotate gradually becomes small, the rotation speed of the driving wheel is reduced but the spiral angle of the spiral trail of the movement of the driving wheel is increased, and thus the moving speed of the robot may be gradually increased with the increase of the included angle. Beyond a certain value, however, the force driving the driving wheel to rotate is reduced to small, which leads to a further reduction of the rotation speed of the driving wheel and to a reduction of the moving speed of the robot. Besides, the operating stability of the robot is reduced and even the robot cannot move forward any more. Therefore, in terms of the conventional spiral moving device, the rotation speed of the driving wheel may change with the change of the included angle between the axis of rotation of the driving wheel and the axis of the body, thus leading to a poor operating stability of the device under different work conditions. In addition, since the driving wheel is turned to rotate by the driving wheel carrier, it is difficult to realize a precise position and a micro displacement adjustment for the robot, thus leading to a poor handling.

SUMMARY OF THE INVENTION

Embodiments of the present invention seek to overcome the disadvantages of the related art, and provide an actively driven pipeline robot with a driving wheel actively rotating and an good operation stability.

The aim of the present invention is realized by following technical solution. An actively driven spiral pipeline robot is provided, comprising a driving wheel carrier, a body, a guide wheel carrier and a power device. The power device is fixedly disposed in the body, the driving wheel carrier is mounted at one end of the body via a bearing and coincides with an axle center of the body, the guide wheel carrier is fixedly disposed on the body, a variable diameter mechanism is disposed on the driving wheel carrier, a driving shaft and an axle are further disposed on the driving wheel carrier, a driving wheel is fixedly mounted on the axle, a bearing saddle is disposed on the variable diameter mechanism, the axle is mounted in the bearing saddle via a bearing, the driving shaft is mounted on the driving wheel carrier via a bearing, the driving shaft and the axle are connected via a connector, the driving shaft is further connected with an output shaft of the power device via a transmission device, and there is an included angle $\theta$ between an axis of the axle and an axis of the body, where $0°\le\theta<90°$.

The transmission device is a driving gear disposed on the output shaft of the power device and a driven gear disposed on the driving shaft, and the driving gear and the driven gear mesh with each other.

The transmission device is a driving gear disposed on the output shaft of the power device, a driven gear disposed on the driving shaft and a speed changer consisting of a multi-stage gear set and disposed between the driving gear and the driven gear, and the multi-stage gear set of the speed changer meshes with the driving gear and the driven gear respectively.

The guide wheel carrier comprises a bracket fixedly connected with the body and a guide device mounted on the bracket, the guide device comprises a front stay leg and a rear stay leg hinged with each other via an hinged shaft, a guide wheel is further mounted on the hinged shaft, an adjusting mechanism axial-sliding along the bracket is mounted at an end of the bracket, the other end of the front stay leg is hinged to the bracket, the other end of the rear stay leg is hinged to the adjusting mechanism, an axis of rotation of the guide wheel is perpendicular to the axis of the body, and at least two or more than two sets of guide devices are uniformly distributed along a circumferential direction of the guide wheel carrier.

The variable diameter mechanism comprises an upright post and a stay post, the upright post is fixedly disposed on a driving stand and is coaxial with the body, the stay post is fixedly disposed on the upright post and is disposed along a direction perpendicular to the axis of the body, a sliding bush A is fitted over the upright post, a sliding bush B is disposed on the stay post, the sliding bush A and the sliding bush B are connected by a ram, both ends of the ram are hinged to the sliding bush A and the sliding bush B respectively, and the bearing saddle is disposed on the sliding bush B.

The variable diameter mechanism is a hydraulic cylinder disposed along a direction perpendicular to the axis of the body, the bearing saddle is fixed disposed at an end of a piston rod A of the hydraulic cylinder. The adjusting mechanism comprises an electric motor disposed in the bracket, a lead screw fixedly connected with a shaft of the electric motor and a slider slidably disposed on the bracket, a lead screw nut is disposed with the slider, the lead screw is connected with the lead screw nut, and the stay leg is hinged to the slider.

The adjusting mechanism comprises a hydraulic chamber disposed in the bracket, a piston rod B disposed in the hydraulic chamber and a slider slidably disposed on the bracket, the slider is fixedly connected with the piston rod B, and the rear stay leg is hinged to the slider.

The adjusting mechanism comprises an electric motor disposed in the bracket, a lead screw fixedly connected with a shaft of the electric motor and a slider slidably disposed on the bracket, a nut is mounted on the lead screw, a spring is mounted between the slider and the nut, one end of the spring is fixedly connected to the nut, and the other end of the spring is fixedly connected to the slider.

The power device is an electric motor or a hydraulic pressure motor.

One or more than one variable diameter mechanisms are disposed on the driving wheel carrier, and a set opening size of the driving wheel can be controlled by the variable diameter mechanisms. When more than one variable diameter mechanisms are disposed on the driving wheel carrier, the variable diameter mechanisms are uniformly distributed along a circumferential direction of the guide wheel carrier, one axle is mounted on each variable diameter mechanism, and the driving shaft connected with each axle is connected with the output shaft of the power device via the transmission device.

One or more than one power devices are disposed on the body.

The present invention has following advantages: the driving wheel is directly driven to rotate by the driving device so that a rotation speed of the driving wheel is not restricted by an included angle between an axis of rotation of the driving wheel and the axis of the body, a scope of application of the robot is expanded, a transmission efficiency is high, an operation is stable under working conditions of different pipeline diameters, and an axial force is large. In addition, the driving wheel is directly driven by the driving device, and an axial position of the robot is adjusted by controlling an operation of the driving wheel, so that an adjustment precision is high, and it is convenient to precisely control a moving position of the robot.

What reference signs in drawings mean:
1—body; 2—power device; 3—driving wheel carrier; 4—variable diameter mechanism; 5—guide wheel carrier; 6—driving shaft; 7—axle; 8—driving wheel; 9—bearing saddle; 10—connector; 11—front stay leg; 12—rear stay leg; 13—guide wheel; 14—driving gear; 15—driven gear; 16—speed changer; 17—adjusting mechanism; 18—pipeline; 19—upright post; 20—stay post; 21—sliding bush A; 22—sliding bush B; 23—ram; 24—hydraulic cylinder; 25—piston A (piston rod A); 26—lead screw; 27—slider; 28—hydraulic chamber; 29—piston B (piston rod B); 30—nut; 31—spring.

DETAILED DESCRIPTION OF THE PREFERRED EMBODIMENTS

The present invention will be described in detail with reference to drawings and embodiments. The protection scope of the present invention is not limited to the following description.

Embodiment 1

Figure 1:
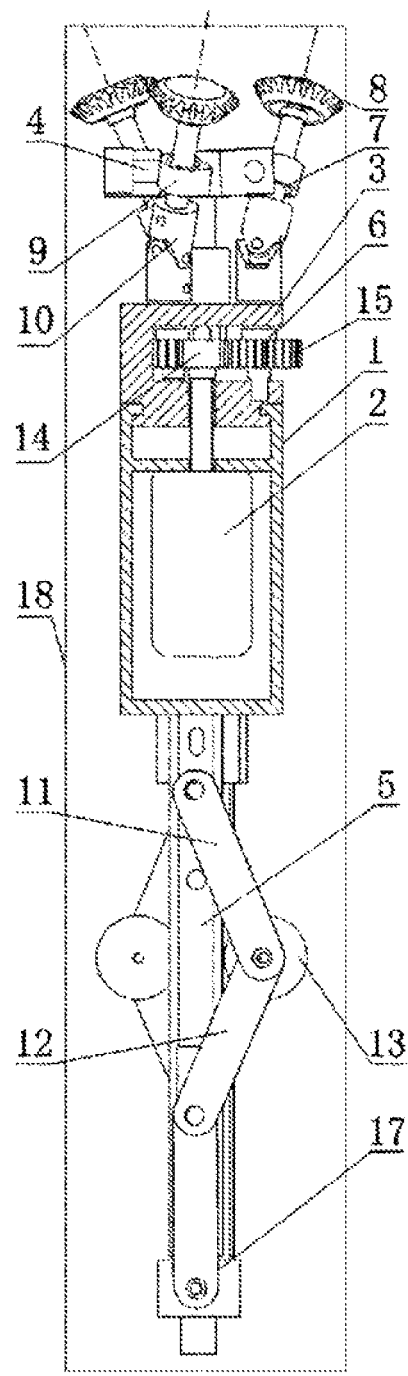
FIG. 1 is a schematic structural view of the present invention.
Figure 2:
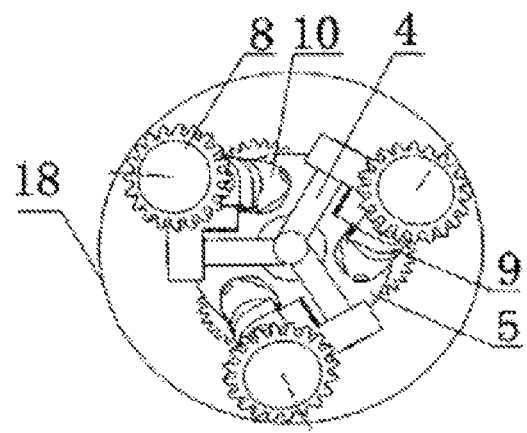
FIG. 2 is a top schematic structural view of the present invention.
Figure 3:
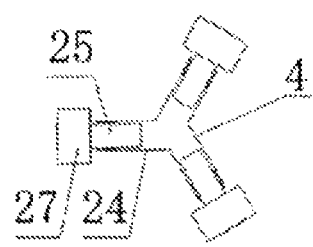
FIG. 3 is a schematic structural view of one type of variable diameter mechanism of the present invention.

As shown in FIG. 1 and FIG. 2, an actively driven spiral pipeline robot comprises a driving wheel carrier 3, a body 1, a guide wheel carrier 5 and a power device 2. The power device 2 is fixedly disposed in the body 1. The driving wheel carrier 3 is rotatablely mounted at one end of the body 1. The guide wheel carrier 5 is fixedly disposed at the other end of the body 1. Three variable diameter mechanisms are uniformly distributed along a circumferential direction of the guide wheel carrier 4, that is, two adjacent variable diameter mechanisms 4 are in an angle of 120°. A driving shaft 6 and an axle 7 are further disposed on the driving wheel carrier 3. A driving wheel 8 is fixedly mounted at one end of the axle 7. An axis of rotation of the driving wheel 8 coincides with an axis of the axle 7. A bearing saddle 9 is disposed on each variable diameter mechanism 4. The axle 7 is mounted in the bearing saddle 9 via a bearing. The driving shaft 6 is mounted on the driving wheel carrier 3 via a bearing. The driving shaft 6 and the axle 7 are connected via a connector W that is a Cardan joint. The driving shaft 6 is further connected with an output shaft of the power device 2 via a transmission device. There is an included angle θ between the axis of the axle 7 and an axis of the body 1, where 0°≤θ<90°. The included angle may be adjusted by adjusting a length of a projecting part of the variable diameter mechanism 4. As shown in FIG. 3, the variable diameter mechanism 4 is a hydraulic cylinder 24 disposed along a direction perpendicular to the axis of the body 1, the bearing saddle 9 is fixed disposed at an end of a piston rod A 25 of the hydraulic cylinder 24, and a radial position of the bearing saddle 9 is controlled by controlling the hydraulic cylinder 24, thus controlling a set opening size of the driving wheel 8.

Figure 4:
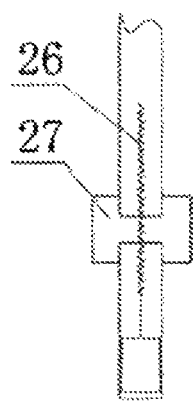
FIG. 4 is a schematic structural view of one type of adjusting mechanism of the present invention.

The guide wheel carrier 5 comprises a bracket fixedly connected with the body 1 and a guide device mounted on the bracket, the guide device comprises a front stay leg 11 and a rear stay leg 12 hinged with each other via an hinged shaft, a guide wheel 13 is mounted on the hinged shaft, an adjusting mechanism 17 axial-sliding along the bracket is mounted at an end of the bracket, the other end of the front stay leg 11 is hinged to the bracket, the other end of the rear stay leg 12 is hinged to the adjusting mechanism 17, an axis of rotation of the guide wheel 13 is perpendicular to the axis of the body 1, and at least two or more than two sets of guide devices are uniformly distributed along a circumferential direction of the guide wheel carrier 5. As shown in FIG. 4, the adjusting mechanism 17 comprises an electric motor disposed in the bracket, a lead screw 26 fixedly connected with the shaft of the electric motor and a slider 27 slidably disposed on the bracket, a lead screw nut is disposed with the slider 27, the lead screw 26 is connected with the lead screw nut, and the rear stay leg 12 is hinged to the slider 27. By controlling the electric motor, the slider 27 may be driven to axially move along the bracket, and a distance between the front stay leg 11 and the rear stay leg 12 may be changed, thus enabling a radial movement of the guide wheel 13.

The power device 2 is an electric motor. An axis of a shaft of the electric motor coincides with the axis of the body 1. The driving wheel carrier 3 is connected with the shaft of the electric motor via a bearing so that the driving wheel carrier 3 is rotatable around the axis of the body 1. The transmission device is a driving gear 14 disposed on the shaft of the electric motor and a driven gear 15 disposed on the driving shaft 6 and meshing with the driving gear 14.

A work process of the embodiment is described as follows. The pipeline robot is displaced in the pipeline 18. The radial position of the driving wheel 8 may be adjusted by adjusting a projecting length of the piston rod A 25 of the hydraulic cylinder 24, thus pressing the driving wheel 8 on an inner wall of the pipeline 18. The radial position of the guide wheel 13 may be adjusted by adjusting a position of the slider 27 on the bracket, thus pressing the guide wheel 13 on the inner wall of the pipeline 18. Then the electric motor is activated, an output shaft of the electric motor drives the driving shaft 6 to rotate by a transmission of the gear, the driving shaft 6 drives the axle 7 to rotate via the connector W, the driving wheel 8 rotates with the axle 7 drive. The driving wheel 8 and the inner wall of the pipeline 18 form a planetary gear train. Since there is an included angle θ between the axis of rotation of the driving wheel 8 and the axis of the body 1, where $0° \leq \theta < 90°$, a movement trail of the driving wheel 8 is a spatial spiral line around an axis of the pipeline 18, thus driving the driving wheel carrier 3 to rotate around the shaft of the electric motor via a bearing and also driving the driving wheel carrier 3 to axially move along the pipeline 18. The driving wheel carrier 3 transmits an axial traction to the body 1 via a bearing, and further drives the body 1 to axially move along the pipeline 18. The guide wheel carrier 5 axially moves along the pipeline 18 following the body 1, and the guide wheel 13 of the guide wheel carrier 5 makes a rotational motion closely against the inner wall of the pipeline 18 so as to play a guide role.

Embodiment 2

Figure 5:
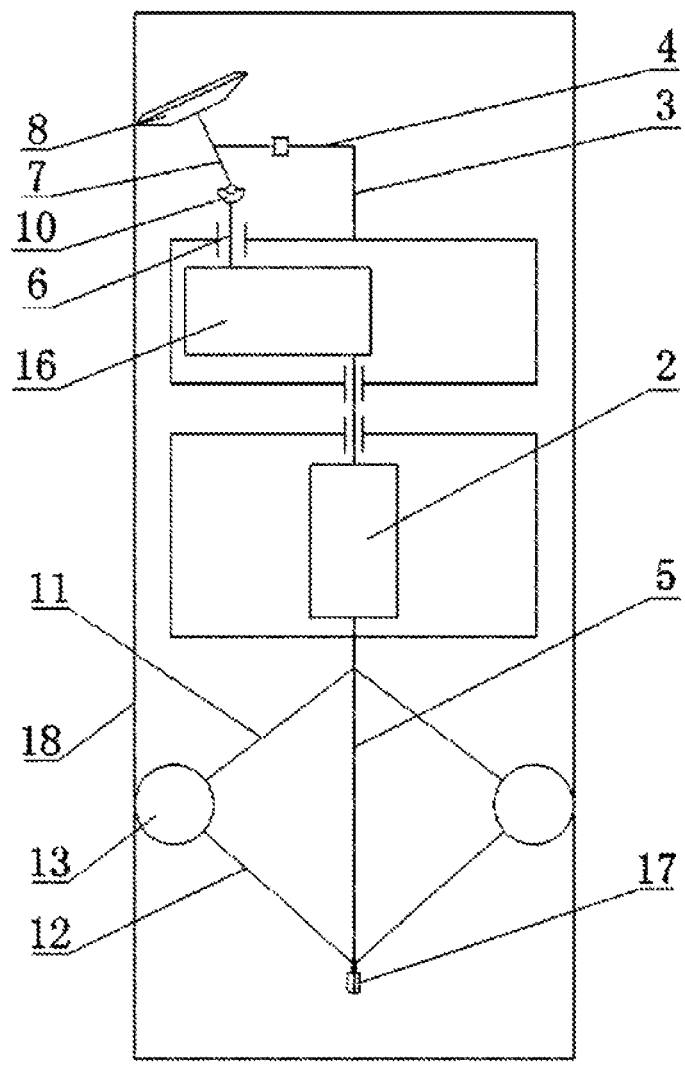
FIG. 5 is a principle structure chart of another structure of the present invention.
Figure 6:
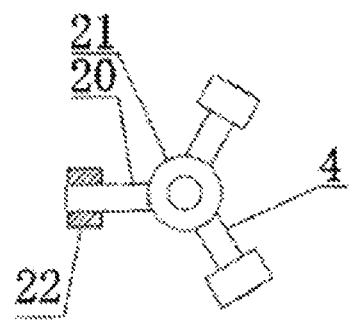
FIG. 6 is a top schematic view of another type of the variable diameter mechanism of the present invention.
Figure 7:
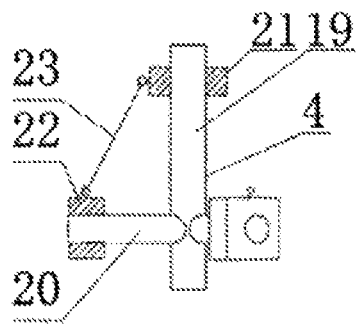
FIG. 7 is a plan view of the variable diameter mechanism shown in FIG. 6.

As shown in FIG. 5, an actively driven spiral pipeline robot comprises a driving wheel carrier 3, a body 1, a guide wheel carrier 5 and a power device 2. The power device 2 is fixedly disposed in the body 1. The driving wheel carrier 3 is rotatably mounted at one end of the body 1. The guide wheel carrier 5 is fixedly disposed at the other end of the body 1. One variable diameter mechanism 4 is disposed on the driving wheel carrier 3. A driving shaft 6 and an axle 7 are further disposed on the driving wheel carrier 3. A driving wheel 8 is fixedly mounted at one end of the axle 7. An axis of rotation of the driving wheel 8 coincides with an axis of the axle 7. A bearing saddle 9 is disposed on the variable diameter mechanism 4. The axle 7 is mounted in the bearing saddle 9 via a bearing. The driving shaft 6 is mounted on the driving wheel carrier 3 via a bearing. The driving shaft 6 and the axle 7 are connected via a connector W that is a Cardan joint. The driving shaft 6 is further connected with an output shaft of the power device 2 via a transmission device. There is an included angle θ between the axis of the axle 7 and an axis of the body 1, where $0° \leq \theta < 90°$. The included angle may be adjusted by adjusting a length of a projecting part of the variable diameter mechanism 4. As shown in FIG. 6 and FIG. 7, the variable diameter mechanism 4 comprises an upright post 19 and a stay post 20, the upright post 19 is fixedly disposed on a driving stand and is coaxial with the body 1, the stay post 20 is fixedly disposed on the upright post 19 and is disposed along a direction perpendicular to the axis of the body 1, a sliding bush A 21 is fitted over the upright post 19, a sliding bush B 22 is disposed on the stay post 20, the sliding bush A 21 and the sliding bush B 22 are connected by a ram 23, both ends of the ram 23 are hinged to the sliding bush A 21 and the sliding bush B 22 respectively, and the bearing saddle 9 is disposed on the sliding bush B 22. By changing a position of the sliding bush A 21 on the upright post 19, a position of the sliding bush B 22 on the stay post 20 may be controlled via the ram 23, thus realizing a radial displacement of the bearing saddle 9 and controlling a set opening size of the driving wheel 8. The change of the position of the sliding bush A 21 on the upright post 19 may be realized by an electric motor or hydraulic pressure control.

Figure 8:
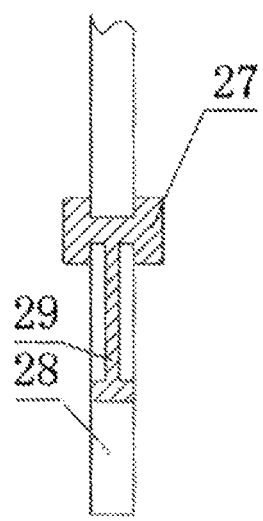
FIG. 8 is a schematic structural view of another type of the adjusting mechanism of the present invention.

The guide wheel carrier 5 comprises a bracket fixedly connected with the body 1 and a guide device mounted on the bracket, the guide device comprises a front stay leg 11 and a rear stay leg 12 hinged with each other via an hinged shaft, a guide wheel 13 is mounted on the hinged shaft, an adjusting mechanism 17 axial-sliding along the bracket is mounted at an end of the bracket, the other end of the front stay leg 11 is hinged to the bracket, the other end of the rear stay leg 12 is hinged to the adjusting mechanism 17, an axis of rotation of the guide wheel 13 is perpendicular to the axis of the body 1, and at least two or more than two sets of guide devices are uniformly distributed along a circumferential direction of the guide wheel carrier 5. As shown in FIG. 8, the adjusting mechanism 17 comprises a hydraulic chamber 28 disposed in the bracket, a piston rod B 29 disposed in the hydraulic chamber 28 and a slider 27 slidably disposed on the bracket, the slider 27 is fixedly connected with the piston rod B 29, and the rear stay leg 12 is hinged to the slider 27. By controlling a hydraulic pressure in the hydraulic chamber 28, a movement of the piston rod B 29 may be controlled, and thus the slider 27 may be driven to axially move along the bracket, and a distance between the front stay leg 11 and the rear stay leg 12 may be changed, thus enabling a radial movement of the guide wheel 13.

The power device 2 is a hydraulic pressure motor. An axis of a shaft of the motor coincides with the axis of the body 1. The driving wheel carrier 3 is connected with the shaft of the motor via a bearing so that the driving wheel carrier 3 is rotatable around the axis of the body 1. The transmission device is a speed changer 16 disposed in the driving wheel carrier 3. The shaft of the hydraulic pressure motor is connected with an input shaft of the speed changer 16 via a shaft coupling, and the driving shaft 6 is connected with an output shaft of the speed changer 16 via a shaft coupling.

A work process of the embodiment is described as follows. The pipeline robot is displaced in the pipeline 18. The radial position of the driving wheel 8 may be adjusted by adjusting the position of the sliding bush A 21 on the upright post 19, thus pressing the driving wheel 8 on an inner wall of the pipeline 18. The radial position of the guide wheel 13 may be adjusted by adjusting a fixed position of the slider 27 on the bracket, thus pressing the guide wheel 13 on the inner wall of the pipeline 18. Then the hydraulic pressure motor is activated, the shaft of the motor drives the driving shaft 6 to rotate by a transmission of the speed changer 16, the driving shaft 6 drives the axle 7 to rotate via the connector W, the driving wheel 8 rotates with the axle 7 drive. The driving wheel 8 and the inner wall of the pipeline 18 form a planetary gear train. Since there is an included angle θ between the axis of rotation of the driving wheel 8 and the axis of the body 1, where 0°≤θ<90°, a movement trail of the driving wheel 8 is a spatial spiral line around an axis of the pipeline 18, thus driving the driving wheel carrier 3 to rotate around the shaft of the motor via a bearing and also driving the driving wheel carrier 3 to axially move along the pipeline 18. The driving wheel carrier 3 transmits an axial traction to the body 1 via a bearing, and further drives the body 1 to axially move along the pipeline 18. The guide wheel carrier 5 axially moves along the pipeline 18 following the body 1, and the guide wheel 13 of the guide wheel carrier 5 makes a rotational motion closely against the inner wall of the pipeline 18 so as to play a guide role.

Embodiment 3

Figure 9:
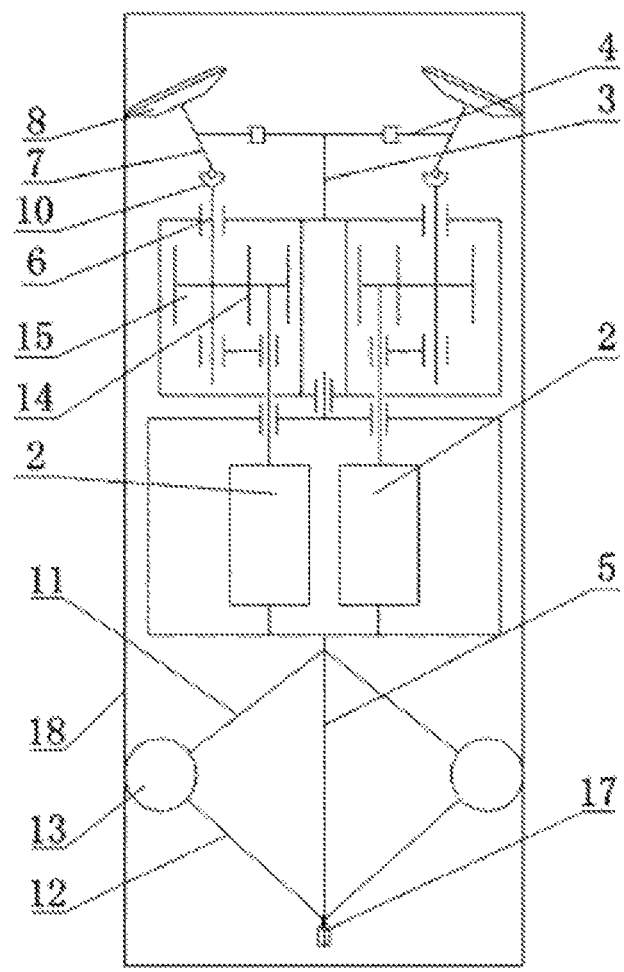
FIG. 9 is a principle structure chart of a third structure of the present invention.

As shown in FIG. 9, an actively driven spiral pipeline robot comprises a driving wheel carrier 3, a body 1, a guide wheel carrier 5 and a power device 2. The power device 2 is fixedly disposed in the body 1. The driving wheel carrier 3 is rotatably mounted at one end of the body 1. The guide wheel carrier 5 is fixedly disposed at the other end of the body 1. Two variable diameter mechanisms are uniformly distributed along a circumferential direction of the guide wheel carrier 4, that is, two adjacent variable diameter mechanisms 4 are in an angle of 180°. A driving shaft 6 and an axle 7 are further disposed on the driving wheel carrier 3. A driving wheel 8 is fixedly mounted at one end of the axle 7. An axis of rotation of the driving wheel 8 coincides with an axis of the axle 7. A bearing saddle 9 is disposed on each variable diameter mechanism 4. The axle 7 is mounted in the bearing saddle 9 via a bearing. The driving shafts 6 are mounted on the driving wheel carrier 3 via a bearing. Two driving shafts 6 are correspondingly disposed on the driving wheel carrier 3, and each driving shaft 6 and the corresponding axle 7 thereof are connected via a connector W that is a Cardan joint. Two power devices 2 are fixedly disposed on the body 1, an output shaft of each power device 2 and the corresponding driving shaft 6 thereof are connected via the transmission device. Each driving shaft 6 is further connected with the output shaft of the corresponding power device 2 thereof via the transmission device. There is an included angle θ between the axis of the axle 7 and an axis of the body 1, where 0°≤θ<90°. The included angle may be adjusted by adjusting a length of a projecting part of the variable diameter mechanism 4. The power device 2 is an electric motor, and the transmission device is a driving gear 14 disposed on a shaft of the electric motor and a driven gear 15 disposed on the driving shaft 6 and meshing with the driving gear 14. As shown in FIG. 7 and FIG. 8, the variable diameter mechanism 4 comprises an upright post 19 and a stay post 20, the upright post 19 is fixedly disposed on a driving stand and is coaxial with the body 1, the stay post 20 is fixedly disposed on the upright post 19 and is disposed along a direction perpendicular to the axis of the body 1, a sliding bush A 21 is fitted over the upright post 19, a sliding bush B 22 is disposed on the stay post 20, the sliding bush A 21 and the sliding bush B 22 are connected by a ram 23, both ends of the ram 23 are hinged to the sliding bush A 21 and the sliding bush B 22 respectively, and the bearing saddle 9 is disposed on the sliding bush B 22. By changing a position of the sliding bush A 21 on the upright post 19, a position of the sliding bush B 22 on the stay post 20 may be controlled via the ram 23, thus realizing a radial displacement of the bearing saddle 9 and controlling a set opening size of the driving wheel 8. The change of the position of the sliding bush A 21 on the upright post 19 may be realized by an electric motor or hydraulic pressure control.

Figure 10:
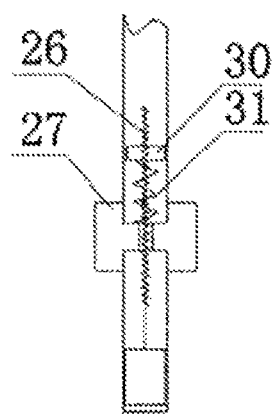
FIG. 10 is a schematic structural view of a third type of the adjusting mechanism of the present invention.

The guide wheel carrier 5 comprises a bracket fixedly connected with the body 1 and a guide device mounted on the bracket, the guide device comprises a front stay leg 11 and a rear stay leg 12 hinged with each other via an hinged shaft, a guide wheel 13 is mounted on the hinged shaft, an adjusting mechanism 17 axial-sliding along the bracket is mounted at an end of the bracket, the other end of the front stay leg 11 is hinged to the bracket, the other end of the rear stay leg 12 is hinged to the adjusting mechanism 17, an axis of rotation of the guide wheel 13 is perpendicular to the axis of the body 1, and at least two or more than two sets of guide devices are uniformly distributed along a circumferential direction of the guide wheel carrier 5. As shown in FIG. 10, the adjusting mechanism 17 comprises an electric motor disposed in the bracket, a lead screw 26 fixedly connected with the shaft of the electric motor and a slider 27 slidably disposed on the bracket, a nut 30 is mounted on the lead screw 26, a spring 31 is mounted between the slider 27 and the nut 30, one end of the spring 31 is fixedly connected to the nut 30, and the other end of the spring 31 is fixedly connected to the slider 27. By controlling the electric motor, the nut 30 is driven to move along the lead screw 26, the nut 30 drives the slider 27 to axially move along the bracket via the spring 31, and a distance between the front stay leg 11 and the rear stay leg 12 is changed, thus enabling a radial movement of the guide wheel 13.

A connecting shaft is disposed at an end of a body stand, an axis of the connecting shaft coincides with the axis of the body 1, and the driving wheel carrier 3 is connected with the connecting shaft via a bearing, thus enabling the driving wheel carrier 3 rotatable around the axis of the body 1.

A work process of the embodiment is described as follows. The pipeline robot is displaced in the pipeline 18. The radial position of the driving wheel 8 may be adjusted by adjusting the position of the sliding bush A 21 on the upright post 19, thus pressing the driving wheel 8 on an inner wall of the pipeline 18. The radial position of the guide wheel 13 may be adjusted by adjusting a fixed position of the slider 27 on the bracket, thus pressing the guide wheel 13 on the inner wall of the pipeline 18. Then the electric motor is activated, an output shaft of each electric motor drives the corresponding driving shaft 6 thereof to rotate by a transmission of the gear, the driving shaft 6 drives the axle 7 to rotate via the connector W, the driving wheel 8 rotates with the axle 7 drive. The driving wheel 8 and the inner wall of the pipeline 18 form a planetary gear train. Since there is an included angle θ between the axis of rotation of the driving wheel 8 and the axis of the body 1, where 0°≤θ<90°, a movement trail of the driving wheel 8 is a spatial spiral line around an axis of the pipeline 18, thus driving the driving wheel carrier 3 to rotate around the connecting shaft via a bearing and also driving the driving wheel carrier 3 to axially move along the pipeline 18. The driving wheel carrier 3 transmits an axial traction to the body 1 via a bearing, and further drives the body 1 to axially move along the pipeline 18. The guide wheel carrier 5 axially moves along the pipeline 18 following the body 1, and the guide wheel 13 of the guide wheel carrier 5 makes a rotational motion closely against the inner wall of the pipeline 18 so as to play a guide role.

Embodiment 4

Figure 11:
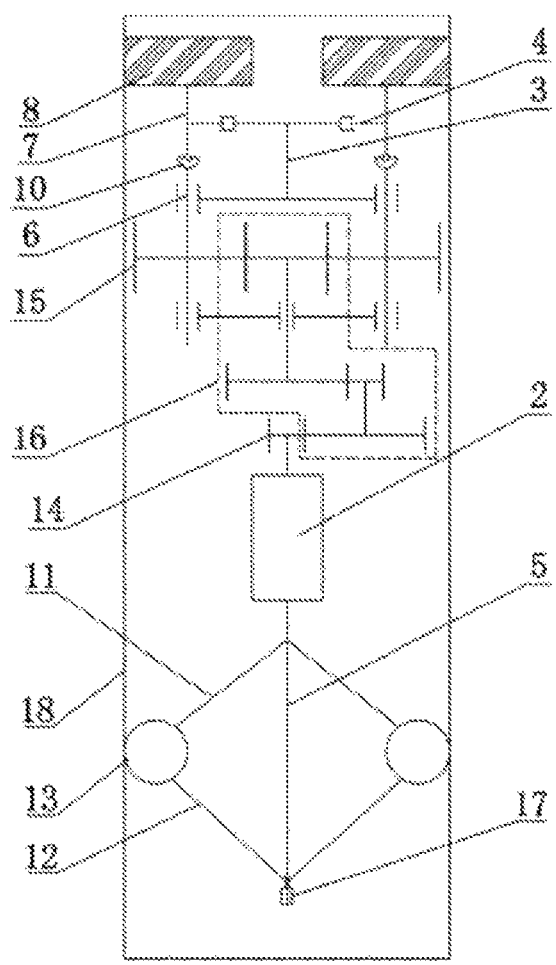
FIG. 11 is a principle structure chart of a fourth structure of the present invention.

As shown in FIG. 11, differences between this embodiment and Embodiment 1 lie in that the included angle between the axis of rotation of the driving wheel 8 and the axis of the body 1 is 0°, that is the axis of rotation of the driving wheel 8 is parallel with the axis of the body 1. The driving gear 14 and the driven gear 15 are connected for transmission by the speed changer 16 which consists of a multi-stage gear set and is disposed between the driving gear 14 and the driven gear 15, and the multi-stage gear set meshes with the driving gear 14 and the driven gear 15 respectively. In this embodiment, during working, because the axis of rotation of the driving wheel 8 is parallel with the axis of the body 1, the movement trail of the driving wheel 8 is a circle around an axis of the pipeline 18, thus driving the driving wheel carrier 3 to rotate around an axle center of the pipeline 18 in the pipeline 18. Since a spiral line is disposed on a surface of the driving wheel 8, under an action of a friction between the spiral line and the inner wall of the pipeline 18, the movement trail of the driving wheel 8 is a spatial spiral line around an axis of the pipeline 18, thus driving the driving wheel carrier 3 to rotate around the shaft of the electric motor via a bearing with the driving of the driving wheel 8 and also driving the driving wheel carrier 3 to axially move along the pipeline 18. The driving wheel carrier 3 transmits an axial traction to the body 1 via a bearing, and further drives the body 1 to axially move along the pipeline 18. The guide wheel carrier 5 axially moves along the pipeline 18 following the body 1, and the guide wheel 13 of the guide wheel carrier 5 makes a rotational motion closely against the inner wall of the pipeline 18 so as to play a guide role.

The invention claimed is:

1. An actively driven spiral pipeline robot, comprising:
a driving wheel carrier;
a body;
a guide wheel carrier;
and a power device; wherein the power device is fixedly disposed in the body;
wherein the driving wheel carrier is mounted at one end of the body via a bearing and is coinciding with an axle center of the body;
wherein the guide wheel carrier is fixedly disposed on the body;
a variable diameter mechanism disposed on the driving wheel carrier;
a driving shaft disposed on the driving wheel carrier;
an axle disposed on the driving wheel carrier;
a driving wheel fixedly mounted on the axle;
a bearing saddle disposed on the variable diameter mechanism;
wherein the axle is mounted in the bearing saddle via a hearing;
wherein the driving shah is mounted on the driving wheel carrier via a hearing;
wherein the driving, shaft and the axle are connected via a connector;
wherein the driving shaft is further connected with an output shaft of the power device via a transmission device;
wherein there is an included angle θ between an axis of the axle and an axis of the body, where 0°≤θ<90°;
wherein the variable diameter mechanism is a hydraulic cylinder disposed along a direction perpendicular to the axis of the body, the bearing saddle is fixed disposed at an end of a piston rod A of the hydraulic cylinder.

2. The actively driven spiral pipeline robot of claim 1, wherein the transmission device further comprises a driving gear disposed on the output shaft of the power device and a driven gear disposed on the driving shaft wherein the driving gear and the driven gear mesh with each other.

3. The actively driven spiral pipeline robot of claim 1, wherein the transmission device further comprises a driving gear disposed on the output shaft of the power device, a driven gear disposed on the driving shaft and a speed changer consisting of a multi-stage gear set and disposed between the driving gear and the driven gear wherein the multi-stage gear set of the speed changer meshes with the driving gear and the driven gear respectively.

4. The actively driven spiral pipeline robot of claim 1, wherein the power device is an electric motor or a hydraulic pressure motor.

5. The actively driven spiral pipeline robot of claim 1, wherein the guide wheel carrier comprises a bracket fixedly connected with the body and a guide device mounted on the bracket;
wherein the guide device further comprises a front stay leg and a rear stay leg hinged with each other via an hinged shaft, a guide wheel which is further mounted on the hinged shaft, an adjusting mechanism which is mounted at an end of the bracket and axial-sliding along the bracket;
wherein the other end of the front stay leg is hinged to the bracket;
wherein the other end of the rear stay leg is hinged to the adjusting mechanism;
wherein an axis of rotation of the guide wheel is perpendicular to the axis of the body;
wherein at least two or more than two sets of guide devices are uniformly distributed along a circumferential direction of the guide wheel carrier.

6. The actively driven spiral pipeline robot of claim 1, wherein the variable diameter mechanism further comprises an upright post and a stay post;
wherein the upright post is fixedly disposed on a driving stand and is coaxial with the body; wherein the stay post is fixedly disposed on the upright post and is disposed along a direction perpendicular to the axis of the body;
wherein a sliding bush A is fitted over the upright post;
wherein a sliding bush B is disposed on the stay post;
wherein the sliding bush A and the sliding bush B are connected by a ram, both ends of the ram are hinged to the sliding bush A and the sliding bush B respectively;
wherein the bearing saddle is disposed on the sliding bush B.

7. The actively driven spiral pipeline robot of claim 5, wherein the adjusting mechanism further comprises an electric motor disposed in the bracket, a lead screw fixedly connected with a shaft of the electric motor, a slider slidably disposed on the bracket, and a lead screw nut disposed with the slider;

wherein the lead screw is connected with the lead screw nut, and the rear stay leg is hinged to the slider.

8. The actively driven spiral pipeline robot of claim 5, wherein the adjusting mechanism further comprises a hydraulic chamber disposed in the bracket, a piston rod B disposed in the hydraulic chamber and a slider slidably disposed on the bracket;

wherein the slider is fixedly connected with the piston rod B, and the rear stay leg is hinged to the slider.

9. The actively driven spiral pipeline robot of claim 5, wherein the adjusting mechanism further comprises an electric motor disposed in the bracket, a lead screw fixedly connected with a shaft of the electric motor, a slider slidably disposed on the bracket, a nut mounted on the lead screw, and a spring mounted between the slider and the nut;

wherein one end of the spring is fixedly connected to the nut, and the other end of the spring is fixedly connected to the slider.

10. The actively driven spiral pipeline robot of claim 2, wherein the power device is an electric motor or a hydraulic pressure motor.

11. The actively driven spiral pipeline robot of claim 3, wherein the power device is an electric motor or a hydraulic pressure motor.

12. The actively driven spiral pipeline robot of claim 2, wherein the guide wheel carrier comprises a bracket fixedly connected with the body and a guide device mounted on the bracket;

wherein the guide device further comprises a front stay leg and a rear stay leg hinged with each other via an hinged shaft, a guide wheel which is further mounted on the hinged shaft, an adjusting mechanism which is mounted at an end of the bracket and axial-sliding along the bracket;

wherein the other end of the front stay leg is hinged to the bracket;

wherein the other end of the rear stay leg is hinged to the adjusting mechanism;

wherein an axis of rotation of the guide wheel is perpendicular to the axis of the body;

wherein at least two or more than two sets of guide devices are uniformly distributed along a circumferential direction of the guide wheel carrier.

13. The actively driven spiral pipeline robot of claim 3, wherein the guide wheel carrier comprises a bracket fixedly connected with the body and a guide device mounted on the bracket;

wherein the guide device further comprises a front stay leg and a rear stay leg hinged with each other via an hinged shaft, a guide wheel which is further mounted on the hinged shaft, an adjusting mechanism which is mounted at an end of the bracket and axial-sliding along the bracket;

wherein the other end of the front stay leg is hinged to the bracket;

wherein the other end of the rear stay leg is hinged to the adjusting mechanism;

wherein an axis of rotation of the guide wheel is perpendicular to the axis of the body;

wherein at least two or more than two sets of guide devices are uniformly distributed along a circumferential direction of the guide wheel carrier.

* * * * *